United States Patent
Kim et al.

(10) Patent No.: US 10,274,054 B2
(45) Date of Patent: Apr. 30, 2019

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Jin Ho Kim, Suwon-si (KR); Dong Hwan Hwang, Seoul (KR); Jong Sool Park, Hwaseong-si (KR); Jong Soo Kim, Seoul (KR); Kyeong Hun Lee, Seoul (KR)

(73) Assignees: HYUNDAI MOTOR COMPANY, Seoul (KR); KIA MOTOR CORPORATION, Seoul (KR)

( * ) Notice: Subject to any disclaimer, the term of this patent is extended or adjusted under 35 U.S.C. 154(b) by 47 days.

(21) Appl. No.: 15/711,375

(22) Filed: Sep. 21, 2017

(65) Prior Publication Data
US 2018/0328460 A1 Nov. 15, 2018

(30) Foreign Application Priority Data

May 10, 2017 (KR) ........................ 10-2017-0058304

(51) Int. Cl.
*F16H 3/66* (2006.01)
(52) U.S. Cl.
CPC ....... *F16H 3/66* (2013.01); *F16H 2200/0069* (2013.01); *F16H 2200/0091* (2013.01); *F16H 2200/2015* (2013.01); *F16H 2200/2046* (2013.01)

(58) Field of Classification Search
CPC .............. F16H 3/66; F16H 2200/0069; F16H 2200/0091; F16H 2200/2015; F16H 2200/2046
See application file for complete search history.

(56) References Cited

U.S. PATENT DOCUMENTS

| 9,163,705 | B1 * | 10/2015 | Hwang | .................. F16H 3/666 |
| 2005/0137050 | A1 * | 6/2005 | Winzeler | .................. F16H 3/66 475/296 |
| 2016/0109004 | A1 * | 4/2016 | Schoolcraft | ............... F16H 3/66 475/219 |
| 2016/0169351 | A1 * | 6/2016 | Lee | ......................... F16H 3/666 475/275 |

\* cited by examiner

*Primary Examiner* — Stacey A Fluhart
(74) *Attorney, Agent, or Firm* — Brinks Gilson & Lione (57) ABSTRACT

A planetary gear train of an automatic transmission for vehicles provides forward ten speed stages and one reverse speed stage. The planetary gear train includes: an input shaft; an output shaft; five planetary gear sets each having three rotation elements; three clutches; three brakes; and nine shafts. Some of the nine shafts may directly connect or selectively connect a plurality of rotation elements among the rotation elements via the clutches, and some of the nine shafts selectively connect selected rotation elements to a transmission housing H via the brakes. In particular, the selected rotation elements are not connected to another rotation element of the five planetary gear sets.

20 Claims, 3 Drawing Sheets

| Shift stage | Coupling element | | | | | | Gear ratio | Interstage ratio | Remark |
|---|---|---|---|---|---|---|---|---|---|
| | C1 | C2 | C3 | B1 | B2 | B3 | | | |
| D1 | | ● | | ● | | ● | 4.175 | 1.546 | Gear ratio width : 9.88  R/D1 ratio : 0.96 |
| D2 | ● | ● | ● | ● | | | 2.700 | 1.401 | |
| D3 | ● | ● | ● | ● | | | 1.927 | 1.435 | |
| D4 | ● | ● | ● | ● | | | 1.343 | 1.343 | |
| D5 | ● | | ● | | | | 1.000 | 1.190 | |
| D6 | ● | | ● | | ● | | 0.840 | 1.197 | |
| D7 | | ● | | | ● | ● | 0.702 | 1.235 | |
| D8 | | ● | | | ● | | 0.569 | 1.151 | |
| D9 | | ● | | | ● | ● | 0.494 | 1.166 | |
| D10 | | | ● | | ● | | 0.424 | - | |
| REV1 | | | ● | ● | | ● | -4.001 | - | |
| REV2 | | | ● | ● | ● | ● | -4.001 | - | |
| REV3 | | | | ● | ● | ● | -4.001 | - | |

FIG. 3

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0058304, filed on May 10, 2017, which is incorporated herein by reference in its entirety.

FIELD

The present disclosure relates to a planetary gear train of an automatic transmission for vehicles that can improve a power delivery performance and fuel consumption and linearity of gear shifts stages.

BACKGROUND

The statements in this section merely provide background information related to the present disclosure and may not constitute prior art.

In general, in an automatic transmission field, a research of a multistage of gear shifts has been performed to reduce fuel consumption and improve drivability of a vehicle.

The multistage of gear shift stages of such an automatic transmission is desired to increase a power performance and driving efficiency while downsizing an engine.

However, as a gear shift stage increases, the number of components of an automatic transmission increases and thus a mounting capability, a cost, a weight, and transfer efficiency are undermined.

Therefore, in order to increase a fuel efficiency through a multistage, a planetary gear train has been developed to enhance power efficiency with reduced components.

Nowadays, an 8-speed automatic transmission has been developed to implement gear shift stages of an 8-speed or more by utilizing a planetary gear train.

However, we have discovered that, in an 8-speed automatic transmission, because a shift span of a gear shift ratio (a factor for securing linearity of interstage ratios) is maintained in a level of 6.5-7.5, an enhancement effect of a power performance and fuel consumption with a downsized engine is below a desired level of efficiency.

Further, when a shift span rises to a level above 9.0, the 8-speed automatic transmission is disadvantage in securing linearity of the ratios between gear shift stages (i.e., interstage ratios).

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having advantages of being capable of improving power delivery efficiency and fuel consumption by reducing a drag loss of a clutch and a brake by applying only six coupling elements instead of applying five planetary gear sets while implementing gear shift stages for ten forward speeds and one reverse speed.

The present disclosure has been made in an effort to further provide a planetary gear train of an automatic transmission for a vehicle having advantages of being capable of enhancing torque transfer efficiency and durability by decreasing torque allotment of each planetary gear set and each coupling element by applying a torque parallel method to an output side planetary gear set.

In addition, the present disclosure further provides a planetary gear train of an automatic transmission with an excellent linearity of interstage ratios by increasing flexibility of an output gear ratio by applying five planetary gear sets in order to implement gear shift stages for ten forward speeds and one reverse speed.

In one form of the present disclosure, a planetary gear train of an automatic transmission for a vehicle includes: an input shaft that receives power of an engine; an output shaft that outputs power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a fifth planetary gear set having thirteenth, fourteenth, and fifteenth rotation elements; a first shaft that is connected with the second rotation element and the input shaft; a second shaft that is connected with the fourteenth rotation element and the output shaft; a third shaft that is connected with the sixth rotation element and the thirteenth rotation element; a fourth shaft that is connected with the seventh rotation element and the fifteenth rotation element; a fifth shaft that is connected with the first rotation element, the fourth rotation element, and the twelfth rotation element; a sixth shaft that is connected with the third rotation element and the eleventh rotation element; a seventh shaft that is connected with the fifth rotation element and the eighth rotation element; an eighth shaft that is connected with the tenth rotation element; and a ninth shaft that is connected with the ninth rotation element.

The planetary gear train may include six coupling elements that selectively connect shafts selected from the nine shafts to each other or a corresponding shaft selected from the nine shafts to a transmission housing, and three coupling elements selected from the six elements are controlled to implement a forward speed stage or a reverse speed stage.

The six coupling elements may include: three clutches that connect two shafts of the nine shafts; and three brakes that selectively connect the transmission housing and the corresponding shaft that is not connected with the input shaft or the output shaft.

The six coupling elements may include: a first clutch that is disposed between the second shaft and the fifth shaft; a second clutch that is disposed between the sixth shaft and the seventh shaft; a third clutch that is disposed between the seventh shaft and the eighth shaft; a first brake that is disposed between the fourth the shaft and the transmission housing; a second brake that is disposed between the ninth shaft and the transmission housing; and a third brake that is disposed between the eighth shaft and the transmission housing.

The first, second, and third rotation elements may be respectively a first sun gear, a first planetary carrier, and a first ring gear, the fourth, fifth, and sixth rotation elements may be respectively a second sun gear, a second planetary carrier, and a second ring gear, the seventh, eighth, and ninth rotation elements may be respectively a third sun gear, a third planetary carrier, and a third ring gear, the tenth, eleventh, and twelfth rotation elements may be respectively a fourth sun gear, a fourth planetary carrier, and a fourth ring gear, and the thirteenth, fourteenth, and fifteenth rotation elements may be respectively a fifth sun gear, a fifth planetary carrier, and a fifth ring gear.

The first, second, third, fourth, and fifth planetary gear sets may be disposed in order of the fourth, first, second, third, and fifth planetary gear sets from an engine side and may be disposed in order of the fourth, first, third, fifth and second planetary gear sets from the engine side.

According to an exemplary form of the present disclosure, by combining five planetary gear sets that are formed with a simple planetary gear set with six coupling elements, ten forward speed gear shift stages and one reverse speed gear shift stage can be implemented.

Further, by securing a shift span of 9.8 or more, engine driving efficiency can be improved and linearity of gear shift stages (e.g., interstage ratios) can be secured and thus drivability (such as acceleration before and after gear shifts) and a sense of rhythm of an engine speed can be improved.

Further, while implementing gear shift stages for ten forward speeds and one reverse speed, by reducing a drag loss of a clutch and a brake by limiting application of a coupling element instead of applying five planetary gear sets, power delivery efficiency and fuel consumption can be improved.

Further, by uniformly distributing an allotment torque of each planetary gear set and each coupling element by applying a torque parallel method to an output side planetary gear set, torque transfer efficiency and durability can be enhanced.

Further, by increasing flexibility of an output gear ratio while applying five planetary gear sets, the planetary gear train provides excellent linearity of gear shift stages for ten forward speed and one reverse speed stages.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Hereinafter, an exemplary form of the present disclosure will be described in detail with reference to the accompanying drawings.

The drawings and description are to be regarded as illustrative in nature and not restrictive. Like reference numerals designate like elements throughout the present disclosure.

In the following description, terms such as a first and a second used in names of constituent elements are used for distinguishing constituent elements having the same name and do not limit order thereof.

Further, as used herein, description of elements being "fixedly" connected or interconnected includes elements that are directly connected, i.e. one element directly connected to another element for rotation therewith.

Figure 1:
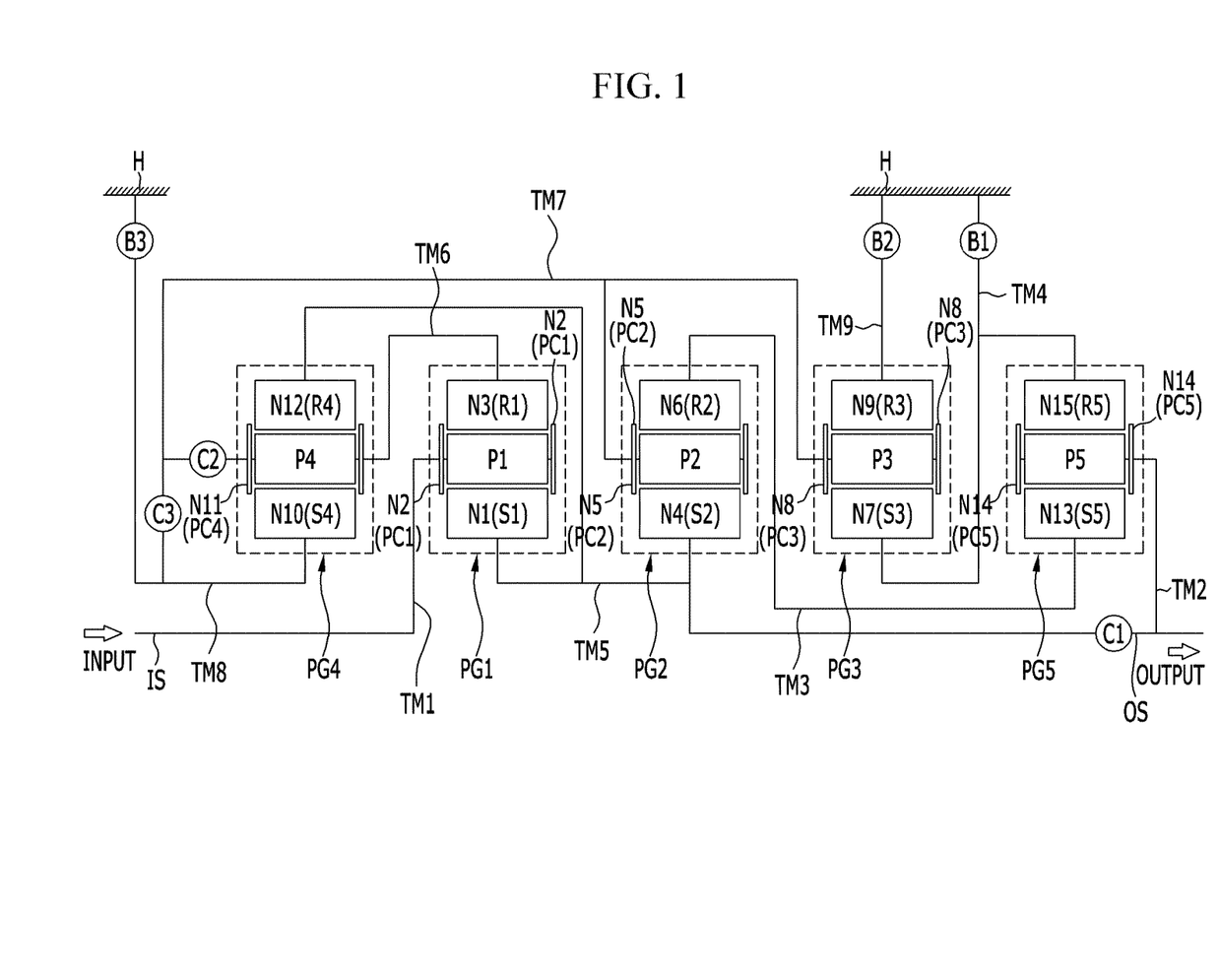
FIG. 1 is a schematic diagram illustrating a planetary gear train according to a first exemplary form of the present disclosure.

FIG. 1 is a schematic diagram illustrating a planetary gear train in a first exemplary form of the present disclosure.

Referring to FIG. 1, a planetary gear train includes: first, second, third, fourth, and fifth planetary gear sets PG1, PG2, PG3, PG4, and PG5 that are disposed on the same shaft line; an input shaft IS; an output shaft OS; nine shafts TM1-TM9 that connect each rotation element of the first, second, third, fourth, and fifth planetary gear sets PG1, PG2, PG3, PG4, and PG5; three clutches C1-C3, which are a coupling element; three brakes B1-B3; and a transmission housing H.

Rotation power from an engine that is input to the input shaft IS is shifted by a mutual compensation operation of the first, second, third, fourth, and fifth planetary gear sets PG1, PG2, PG3, PG4, and PG5 to be output through the output shaft OS.

In a first exemplary form of the present disclosure, each planetary gear set is disposed in order of fourth, first, second, third, and fifth planetary gear sets PG4, PG1, PG2, PG3, and PG5 from the engine side.

The input shaft IS is an input member, and rotation power from a crankshaft of the engine may convert a torque through a torque converter to be input.

The output shaft OS is an output member and may be disposed on the same shaft line as that of the input shaft IS to deliver a shifted driving torque to a drive shaft through a differential apparatus.

The first planetary gear set PG1 is a single pinion planetary gear set and includes a first sun gear S1, which is a first rotation element N1, a first planetary carrier PC1, which is a second rotation element N2 that supports to rotate and revolve a plurality of first pinion gears P1 that are circumscribed engaged in a radial equal gap at the external circumference side of the first sun gear S1, and a first ring gear R1, which is a third rotation element N3 that is inscribed engaged with the plurality of first pinion gears P1 to be power connected with the first sun gear S1.

The second planetary gear set PG2 is a single pinion planetary gear set and includes a second sun gear S2, which is a fourth rotation element N4, a second planetary carrier PC2, which is a fifth rotation element N5 that supports to rotate and revolve a plurality of second pinion gears P2 that are circumscribed engaged in a radial equal gap at the external circumference side of the second sun gear S2, and a second ring gear R2, which is a sixth rotation element N6 that is inscribed engaged with the plurality of second pinion gears P2 to be power connected with the second sun gear S2.

The third planetary gear set PG3 is a single pinion planetary gear set and includes a third sun gear S3, which is a seventh rotation element N7, a third planetary carrier PC3, which is an eighth rotation element N8 that supports to rotate and revolve a plurality of third pinion gears P3 that are circumscribed engaged in a radial equal gap at the external circumference side of the third sun gear S3, and a third ring gear R3, which is a ninth rotation element N9 that is inscribed engaged with the plurality of third pinion gears P3 to be power connected with the third sun gear S3.

The fourth planetary gear set PG4 is a single pinion planetary gear set and includes a fourth sun gear S4, which is a tenth rotation element N10, a fourth planetary carrier PC4, which is an eleventh rotation element N11 that supports to rotate and revolve a plurality of fourth pinion gears P4 that are circumscribed engaged in a radial equal gap at the external circumference side of the fourth sun gear S4, and a fourth ring gear R4, which is a twelfth rotation element N12 that is inscribed engaged with the plurality of fourth pinion gears P4 to be power connected with the fourth sun gear S4.

The fifth planetary gear set PG5 is a single pinion planetary gear set and includes a fifth sun gear S5, which is a thirteenth rotation element N13, a fifth planetary carrier PC5, which is an fourteenth rotation element N14 that supports to rotate and revolve a plurality of fifth pinion gears P5 that are circumscribed engaged in a radial equal gap at the external circumference side of the fifth sun gear S5, and a fifth ring gear R5, which is a fifteenth rotation element N15 that is inscribed engaged with the plurality of fifth pinion gears P5 to be power connected with the fifth sun gear S5.

Here, because the first rotation element N1, the fourth rotation element N4, and the twelfth rotation element N12 are directly connected to each other, the third rotation element N3 and the eleventh rotation element N11 are directly connected to each other, the fifth rotation element N5 and the eighth rotation element N8 are directly connected to each other, the sixth rotation element N6 and the thirteenth rotation element N13 are directly connected to each other, and the seventh rotation element N7 and the fifteenth rotation element N15 are directly connected to each other, the first, second, third, fourth, and fifth planetary gear sets PG1, PG2, PG3, PG4, and PG5 operate while having total nine shafts TM1-TM9.

A configuration of the nine shafts TM1-TM9 is described in detail as follows.

The nine shafts TM1-TM9 may be a rotation member that delivers power while rotating together with rotation elements of the planetary gear sets PG1, PG2, PG3, PG4, and PG5. The nine shafts may directly connect or selectively connect a plurality of rotation elements among the rotation elements of the planetary gear sets PG1, PG2, PG3, PG4, and PG5 and may be a rotation member that selectively connects the rotation element to a transmission housing H or may be a fixing member that directly connects and fixes the rotation element to the transmission housing H.

The first shaft TM1 is connected with the second rotation element (N2; first planetary carrier PC1) and is directly connected with the input shaft IS to always operate as an input element.

The second shaft TM2 is connected, and preferably fixedly connected, with the fourteenth rotation element {N14: fifth planetary carrier PC5} and is directly connected with the output shaft OS to always operate as an output element.

The third shaft TM3 is connected, and preferably fixedly connected, with the sixth rotation element {N6: second ring gear R2} and the thirteenth rotation element {N13; fifth sun gear S5}.

The fourth shaft TM4 is connected, and preferably fixedly connected, with the seventh rotation element {N7; third sun gear S3} and the fifteenth rotation element {N15; fifth ring gear R5}.

The fifth shaft TM5 is connected, and preferably fixedly connected, with the first rotation element {N1; first sun gear S1}, the fourth rotation element {N4; second sun gear S2}, and the twelfth rotation element {N12; fourth ring gear R4}.

The sixth shaft TM6 is connected, and preferably fixedly connected, with the third rotation element {N3: first ring gear R1} and the eleventh rotation element {N11; fourth planetary carrier PC4}.

The seventh shaft TM7 is connected, and preferably fixedly connected, with the fifth rotation element {N5; second planetary carrier PC2} and the eighth rotation element {N8; third planetary carrier PC3}.

The eighth shaft TM8 is connected, and preferably fixedly connected, with the tenth rotation element {N10: fourth sun gear S4}.

The ninth shaft TM9 is connected, and preferably fixedly connected, with the ninth rotation element {N9; third ring gear R3}.

Here, the second shaft TM2 is selectively connected with the fifth shaft TM5 to be power connected with the fifth shaft TM5, and the sixth shaft TM6 and the eighth shaft TM8 each are selectively connected with the seventh shaft TM7 to be power connected with the seventh shaft TM7.

Further, the fourth shaft TM4, the ninth shaft TM9, and the eighth shaft TM8 operate as a selective fixed element while being selectively connected with the transmission housing H.

Among the nine shafts TM1-TM9, in a portion including the input shaft IS and the output shaft OS and that mutually selectively connects shafts, clutches C1, C2, and C3, which are three coupling elements, are disposed.

Further, among the nine shafts TM1-TM9, in a portion in which the shaft and the transmission housing H are selectively connected, brakes B1, B2, and B3, which are three coupling elements, are disposed.

Here, the three clutches C1-C3 and three brakes B1-B3, which are the six coupling elements, are described as follows.

The first clutch C1 is disposed between the second shaft TM2 and the fifth shaft TM5 to selectively connect the second shaft TM2 and the fifth shaft TM5, thereby delivering power.

The second clutch C2 is disposed between the sixth shaft TM6 and the seventh shaft TM7 to selectively connect the sixth shaft TM6 and the seventh shaft TM7, thereby delivering power.

The third clutch C3 is disposed between the seventh shaft TM7 and the eighth shaft TM8 to selectively connect the seventh shaft TM7 and the eighth shaft TM8, thereby delivering power.

The second brake B1 is disposed between the fourth shaft TM4 and the transmission housing H to selectively connect and fix the fourth shaft TM4 to the transmission housing H.

The second brake B2 is disposed between the ninth shaft TM9 and the transmission housing H to selectively connect and fix the ninth shaft TM9 to the transmission housing H.

The third brake B3 is disposed between the eighth shaft TM8 and the transmission housing H to selectively connect and fix the eighth shaft TM8 to the transmission housing H.

Here, coupling elements that are formed with the first, second, and third clutches C1, C2, and C3 and the first, second, and third brakes B1, B2, and B3 may be formed with a multiplate type hydraulic friction coupling unit that operates by a hydraulic pressure that is supplied from a hydraulic control apparatus, and a wet multiplate type hydraulic friction coupling unit is generally used, but the coupling elements may be formed with a coupling unit that may be operated according to an electrical signal that is supplied from an electronic control apparatus such as a dog clutch, an electronic clutch, and a magnetic particle clutch.

Figure 2:
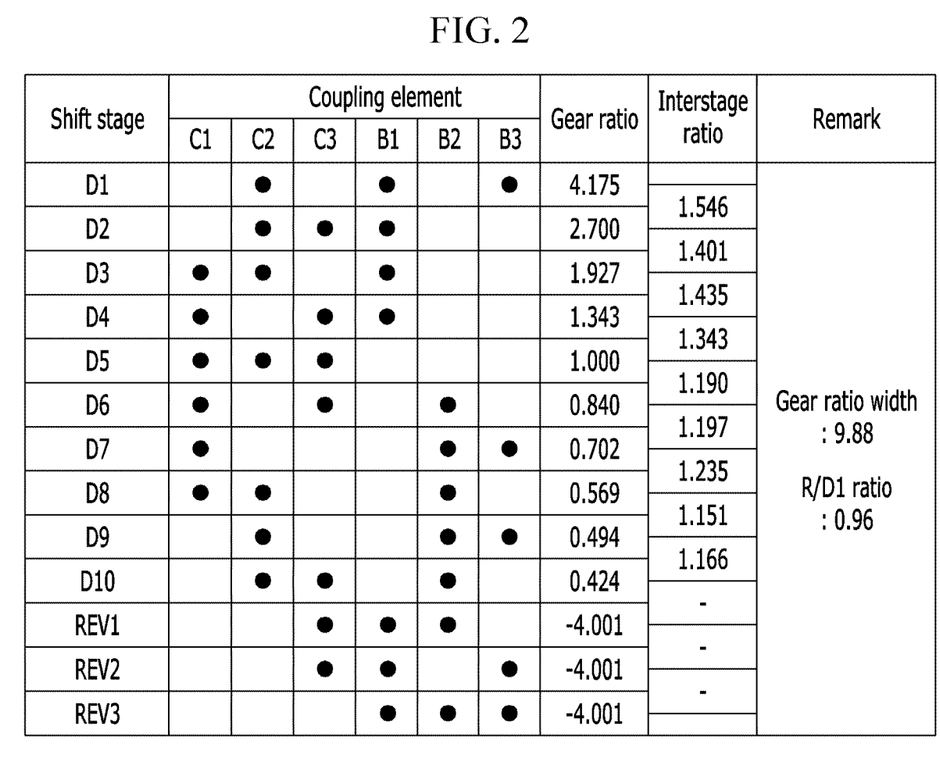
FIG. 2 is a table illustrating operation of a gear shift stage by control elements applied to a planetary gear train according to a first exemplary form of the present disclosure.

FIG. 2 is a table illustrating operation of a gear shift stage by control elements applied to a planetary gear train according to a first exemplary form of the present disclosure.

Referring to FIG. 2, in each gear shift stage of the planetary gear train according to a first exemplary form of the present disclosure, three elements operate among the first, second, and third clutches C1, C2, and C3 and the first, second, and third brakes B1, B2, and B3, which are coupling elements, to provide ten forward speed stages and one reverse speed stage. the shifting process of the speed stages is described as follows.

In a forward one-speed gear shift stage D1, the second clutch C2 and the first and third brakes B1 and B3 simultaneously operate.

Accordingly, in a state in which the sixth shaft TM6 is connected with the seventh shaft TM7 by an operation of the second clutch C2, an input to the first shaft TM1 is performed.

In the input state, while the fourth and eighth shafts TM4 and TM8 operate as a fixed element by operation of the first and third brakes B1 and B3, shifting to a forward one-speed is performed and thus an output is performed to the output shaft OS that is connected with the second shaft TM2.

In a forward two-speed gear shift stage D2, the second and third clutches C2 and C3 and the first brake B1 simultaneously operate.

Accordingly, in a state in which the sixth shaft TM6 is connected with the seventh shaft TM7 by an operation of the second clutch C2 and in which the seventh shaft TM7 is connected with the eights shaft TM8 by an operation of the third clutch C3, an input is performed to the first shaft TM1.

In the input state, while the fourth shaft TM4 operates as a fixed element by operation of the first brake B1, shifting to a forward two-speed is performed and thus an output is performed to the output shaft OS that is connected with the second shaft TM2.

In a forward three-speed gear shift stage D3, the first and second clutches C1 and C2 and the first brake B1 simultaneously operate.

Accordingly, in a state in which the second shaft TM2 is connected with the fifth shaft TM5 by an operation of the first clutch C1 and in which the six shaft TM6 is connected with the seventh shaft TM7 by an operation of the second clutch C2, an input is performed to the first shaft TM1.

In the input state, while the fourth shaft TM4 operates as a fixed element by operation of the first brake B1, shifting to a forward three-speed is performed and thus an output is performed to the output shaft OS that is connected with the second shaft TM2.

In a forward four-speed gear shift stage D4, the first and third clutches C1 and C3 and the first brake B1 simultaneously operate.

Accordingly, in a state in which the second shaft TM2 is connected with the fifth shaft TM5 by operation of the first clutch C1 and in which the seventh shaft TM7 is connected with the eighth shaft TM8 by operation of the third clutch C3, an input is performed to the first shaft TM1.

In the input state, while the fourth shaft TM4 operates as a fixed element by operation of the first brake B1, shifting to a forward four-speed is performed and thus an output is performed to the output shaft OS that is connected with the second shaft TM2.

In a forward five-speed gear shift stage D5, the first, second, and third clutches C1, C2, and C3 simultaneously operate.

Accordingly, in a state in which the second shaft TM2 is connected with the fifth shaft TM5 by operation of the first clutch C1 and in which the sixth shaft TM6 is connected with the seventh shaft TM7 by operation of the second clutch C2 and in which the seventh shaft TM7 is connected with the eighth shaft TM8 by operation of the third clutch C3, an input is performed to the first shaft TM1.

Therefore, the first, second, third, fourth, and fifth planetary gear sets PG1, PG2, PG3, PG4, and PG5 are integrally formed to be in a state of rotating in one, and when an input to the first shaft TM1 is performed, shifting to a forward five-speed is performed in which an input becomes an output and thus an output is performed to the output shaft OS that is connected with the second shaft TM2.

In a forward six-speed gear shift stage D6, the first and third clutches C1 and C3 and the second brake B2 simultaneously operate.

Accordingly, in a state in which the second shaft TM2 is connected with the fifth shaft TM5 by operation of the first clutch C1 and in which the seventh shaft TM7 is connected with the eighth shaft TM8 by operation of the third clutch C3, an input is performed to the first shaft TM1.

In the input state, while the ninth shaft TM9 operates as a fixed element by operation of the second brake B2, shifting to a forward six-speed is performed and thus an output is performed to the output shaft OS that is connected with the second shaft TM2.

In a forward seven-speed gear shift stage D7, the first clutch C1 and the second and third brakes B2 and B3 simultaneously operate.

Accordingly, in a state in which the second shaft TM2 is connected with the fifth shaft TM5 by an operation of the first clutch C1, an input is performed to the first shaft TM1.

In the input state, while the ninth and eighth shafts TM9 and TM8 operate as a fixed element by operation of the second and third brakes B2 and B3, shifting to a forward seven-speed is performed and thus an output is performed to the output shaft OS that is connected with the second shaft TM2.

In a forward eight-speed gear shift stage D8, the first and second clutches C1 and C2 and the second brake B2 simultaneously operate.

Accordingly, in a state in which the second shaft TM2 is connected with the fifth shaft TM5 by operation of the first clutch C1 and in which the sixth shaft TM6 is connected with the seventh shaft TM7 by operation of the second clutch C2, an input is performed to the first shaft TM1.

In the input state, while the ninth shaft TM9 operates as a fixed element by operation of the second brake B2, shifting to a forward eight-speed is performed and thus an output is performed to the output shaft OS that is connected with the second shaft TM2.

In a forward nine-speed gear shift stage D9, the second clutch C2 and the second and third brakes B2 and B3 simultaneously operate.

Accordingly, in a state in which the sixth shaft TM6 is connected with the seventh shaft TM7 by an operation of the second clutch C2, an input is performed to the first shaft TM1.

In the input state, while the ninth and eighth shafts TM9 and TM8 operate as a fixed element by operation of the second and third brakes B2 and B3, shifting to a forward nine-speed is performed and thus an output is performed to the output shaft OS that is connected with the second shaft TM2.

In a forward ten-speed gear shift stage D10, the second and third clutches C2 and C3 and the second brake B2 simultaneously operate.

Accordingly, in a state in which the sixth shaft TM6 is connected with the seventh shaft TM7 by operation of the second clutch C2 and in which the seventh shaft TM7 is connected with the eighth shaft TM8 by operation of the third clutch C3, an input is performed to the first shaft TM1.

In the input state, while the ninth shaft TM9 operates as a fixed element by operation of the second brake B2, shifting to a forward ten-speed is performed and thus an output is performed to the output shaft OS that is connected with the second shaft TM2.

Shifting to the reverse stage is performed according to three operation forms REV1, REV2, REV3.

In the REV1, the third clutch C3 and the first and second brakes B1 and B2 simultaneously operate.

Accordingly, in a state in which the seventh shaft TM7 is connected with the eighth shaft TM8 by operation of the third clutch C3, an input is performed to the first shaft TM1.

In the input state, while the fourth and ninth shafts TM4 and TM9 operate as a fixed element by operation of the first and second brakes B1 and B2, shifting to the reverse stage (i.e., REV 1) is performed and thus a reverse rotation is output to the output shaft OS that is connected with the second shaft TM2.

Further, in the REV2, the third clutch C3 and the first and third brakes B1 and B3 simultaneously operate.

Accordingly, in a state in which the seventh shaft TM7 is connected with the eighth shaft TM8 by an operation of the third clutch C3, an input is performed to the first shaft TM1.

In the input state, while the fourth and eighth shafts TM4 and TM8 operate as a fixed element by operation of the first and third brakes B1 and B3, shifting to the reverse stage (i.e., REV 2) is performed and thus a reverse rotation is output to the output shaft OS that is connected with the second shaft TM2.

Further, in the REV3, the first, second, and third brakes B1, B2, and B3 simultaneously operate.

Accordingly, an input is performed to the first shaft TM1.

In the input state, while the fourth, ninth, and eighth shafts TM4, TM9, and TM8 operate as a fixed element by operation of the first, second, and third brakes B1, B2, and B3, shifting to the reverse stage (i.e., REV 3) is performed and thus a reverse rotation is output to the output shaft OS that is connected with the second shaft TM2.

Figure 3:
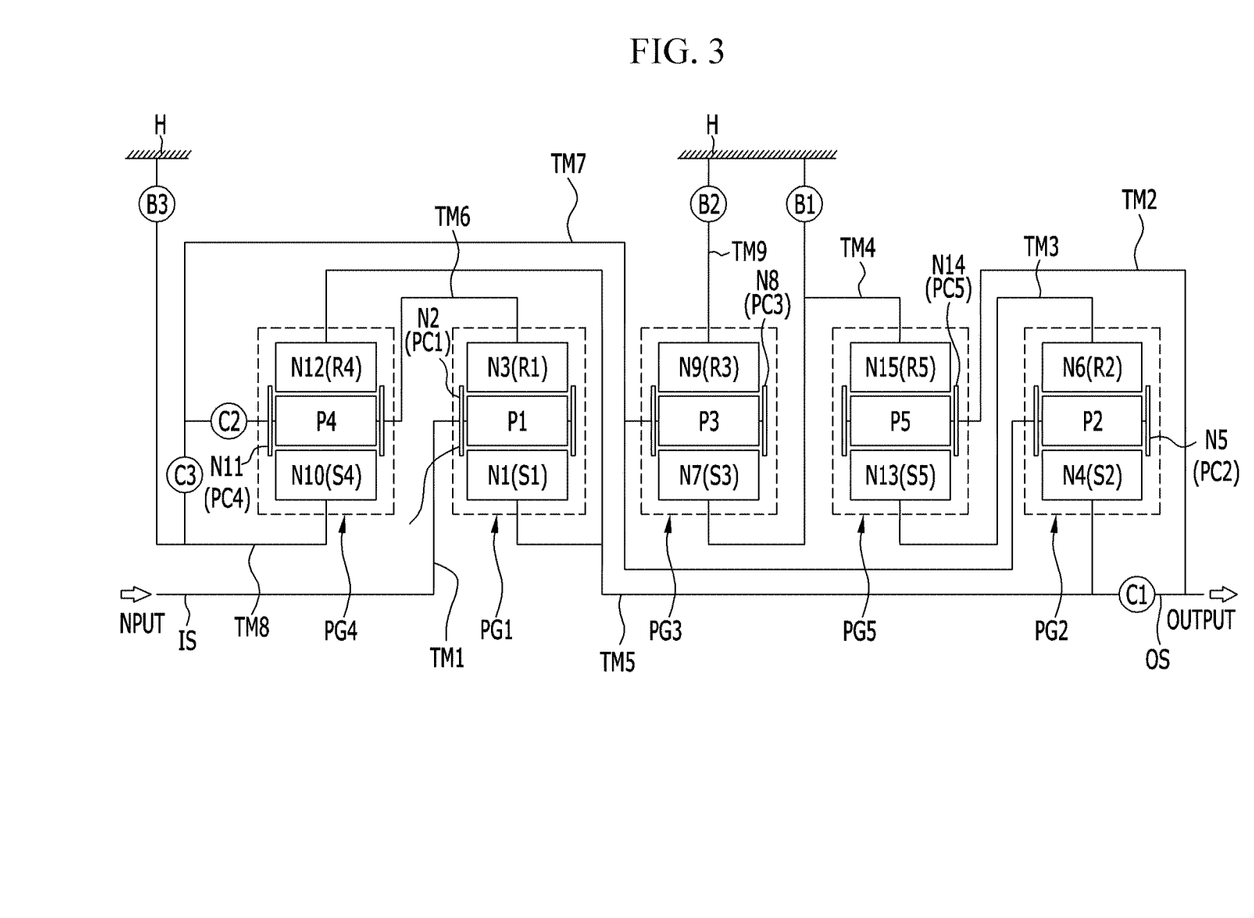
FIG. 3 is a schematic diagram illustrating a planetary gear train according to a second form of the present disclosure.

FIG. 3 is a schematic diagram illustrating a planetary gear train according to a second form of the present disclosure.

Referring to FIGS. 1 and 3, in a planetary gear train according to a first exemplary form of the present disclosure, each planetary gear set is disposed in order of fourth, first, second, third, and fifth planetary gear sets PG4, PG1, PG2, PG3, and PG5 from the engine side, but in a planetary gear train according to a second exemplary form of the present disclosure, each planetary gear set is disposed in order of fourth, first, third, fifth, and second planetary gear sets PG4, PG1, PG3, PG5, and PG2 from the engine side and thus the planetary gear train according to the first exemplary form is different from the planetary gear train according to the second exemplary form.

The planetary gear train according to the second exemplary form is different only in a disposition configuration of the planetary gear sets from the planetary gear train according to the first exemplary form, but nine shafts TM1-TM9, which are major constituent elements, and entire connection relations of three clutches C1, C2, and C3 and three brakes B1, B2, and B3, which are each coupling element, are the same, and thus operation and effect of an entire planetary gear train are the same.

The planetary gear train according to first and second exemplary forms of the present disclosure may realize a gear shift stages for ten forward speeds and one reverse speed by applying only six coupling elements that are formed with three clutches C1, C2, and C3 and three brakes B1, B2, and B3 instead of applying five planetary gear sets PG1, PG2, PG3, PG4, and PG5.

Further, because a shift span is secured to at least 9.8, engine driving efficiency can be improved, and by securing linearity of gear shift stages (i.e., interstage ratios) according to a multistage of high efficiency, drivability such as acceleration before and after shift and a sense of rhythm of an engine speed can be improved.

Further, even while implementing gear shift stages for ten forward speeds and one reverse speed, by reducing coupling elements such as a clutch and a brake which may cause a drag loss, power delivery efficiency and fuel consumption can be improved due to less drag loss.

Further, by uniformly distributing an allotment torque of each planetary gear set and each coupling element by applying a torque parallel method to an output side planetary gear set, torque transfer efficiency and durability can be improved.

Further, in order to implement gear shift stages for ten forward speeds and one reverse speed, five planetary gear sets are applied and thus flexibility of an output gear ratio can be increased and thus a planetary gear train of high efficiency having excellent linearity in an interstage ratio of a gear shift stage is provided.

While this present disclosure has been described in connection with what is presently considered to be practical example forms, it is to be understood that the present disclosure is not limited to the disclosed forms, but, on the contrary, is intended to cover various modifications and equivalent arrangements included within the spirit and scope of the present disclosure.

What is claimed is:

1. A planetary gear train of an automatic transmission for a vehicle, the planetary gear train comprising:
   an input shaft configured to receive power of an engine;
   an output shaft configured to output power;
   a first planetary gear set having first, second, and third rotation elements;
   a second planetary gear set having fourth, fifth, and sixth rotation elements;
   a third planetary gear set having seventh, eighth, and ninth rotation elements;
   a fourth planetary gear set having tenth, eleventh, and twelfth rotation elements;
   a fifth planetary gear set having thirteenth, fourteenth, and fifteenth rotation elements;
   a first shaft connected with the second rotation element and the input shaft;
   a second shaft connected with the fourteenth rotation element and the output shaft;
   a third shaft connected with the sixth rotation element and the thirteenth rotation element;
   a fourth shaft connected with the seventh rotation element and the fifteenth rotation element;
   a fifth shaft connected with the first rotation element, the fourth rotation element, and the twelfth rotation element;
   a sixth shaft connected with the third rotation element and the eleventh rotation element;
   a seventh shaft connected with the fifth rotation element and the eighth rotation element;
   an eighth shaft connected with the tenth rotation element; and
   a ninth shaft connected with the ninth rotation element.

2. The planetary gear train of claim 1, wherein the planetary gear train comprises six coupling elements configured to selectively connect shafts selected from the nine shafts to each other or a corresponding shaft selected from the nine shafts to a transmission housing, and three coupling elements selected from the six coupling elements are controlled to implement a forward speed stage or a reverse speed stage.

3. The planetary gear train of claim 2, wherein the six coupling elements comprise:
   three clutches configured to connect two shafts of the nine shafts; and
   three brakes configured to selectively connect the transmission housing to the corresponding shaft that is not connected with the input shaft or the output shaft.

4. The planetary gear train of claim 2, wherein the six coupling elements comprise:
   a first clutch disposed between the second shaft and the fifth shaft;
   a second clutch disposed between the sixth shaft and the seventh shaft;
   a third clutch disposed between the seventh shaft and the eighth shaft;
   a first brake disposed between the fourth the shaft and the transmission housing;
   a second brake disposed between the ninth shaft and the transmission housing; and
   a third brake disposed between the eighth shaft and the transmission housing.

5. The planetary gear train of claim 1, wherein the first, second, and third rotation elements are respectively a first sun gear, a first planetary carrier, and a first ring gear,
   the fourth, fifth, and sixth rotation elements are respectively a second sun gear, a second planetary carrier, and a second ring gear,
   the seventh, eighth, and ninth rotation elements are respectively a third sun gear, a third planetary carrier, and a third ring gear,
   the tenth, eleventh, and twelfth rotation elements are respectively a fourth sun gear, a fourth planetary carrier, and a fourth ring gear, and
   the thirteenth, fourteenth, and fifteenth rotation elements are respectively a fifth sun gear, a fifth planetary carrier, and a fifth ring gear.

6. The planetary gear train of claim 1, wherein the first, second, third, fourth, and fifth planetary gear sets are disposed in order of the fourth, first, second, third, and fifth planetary gear sets from an engine side.

7. The planetary gear train of claim 1, wherein the first, second, third, fourth, and fifth planetary gear sets are disposed in order of the fourth, first, third, fifth, and second planetary gear sets from an engine side.

8. A planetary gear train of an automatic transmission for a vehicle, the planetary gear train comprising:
   an input shaft configured to receive power of an engine;
   an output shaft configured to output power;
   a first planetary gear set having first, second, and third rotation elements;
   a second planetary gear set having fourth, fifth, and sixth rotation elements;
   a third planetary gear set having seventh, eighth, and ninth rotation elements;
   a fourth planetary gear set having tenth, eleventh, and twelfth rotation elements;
   a fifth planetary gear set having thirteenth, fourteenth, and fifteenth rotation elements;
   a first shaft connected with the second rotation element and the input shaft;
   a second shaft connected with the fourteenth rotation element and the output shaft;
   a third shaft connected with the sixth rotation element and the thirteenth rotation element;
   a fourth shaft connected with the seventh rotation element and the fifteenth rotation element;
   a fifth shaft connected with the first rotation element, the fourth rotation element, and the twelfth rotation element;
   a sixth shaft connected with the third rotation element and the eleventh rotation element;
   a seventh shaft connected with the fifth rotation element and the eighth rotation element; and
   a plurality of shafts selectively connected with a transmission housing, wherein the plurality of shafts are respectively connected to a corresponding rotation element of the third and fourth planetary gear sets that is not connected to another rotation element selected from the rotation elements of the five planetary gear sets.

9. The planetary gear train of claim 8, wherein the plurality of shafts comprise:
   an eighth shaft connected with the tenth rotation element; and
   a ninth shaft connected with the ninth rotation element.

10. The planetary gear train of claim 9, wherein the planetary gear train further comprises:
    three clutches configured to connect two shafts among the nine shafts; and
    three brakes configured to selectively connect the transmission housing to a shaft selected from the nine shafts, wherein the selected shaft is not connected with the input shaft or the output shaft.

11. The planetary gear train of claim 10, wherein the three clutches comprise:
    a first clutch arranged between the second shaft and the fifth shaft;
    a second clutch arranged between the sixth shaft and the seventh shaft; and
    a third clutch arranged between the seventh shaft and the eighth shaft,
    wherein the three brakes comprise:
    a first brake arranged between the fourth the shaft and the transmission housing;
    a second brake arranged between the ninth shaft and the transmission housing; and
    a third brake arranged between the eighth shaft and the transmission housing.

12. The planetary gear train of claim 8, wherein the first, second, and third rotation elements respectively correspond to a first sun gear, a first planetary carrier, and a first ring gear,
    the fourth, fifth, and sixth rotation elements respectively correspond to a second sun gear, a second planetary carrier, and a second ring gear,
    the seventh, eighth, and ninth rotation elements respectively correspond to a third sun gear, a third planetary carrier, and a third ring gear,
    the tenth, eleventh, and twelfth rotation elements respectively correspond to a fourth sun gear, a fourth planetary carrier, and a fourth ring gear, and
    the thirteenth, fourteenth, and fifteenth rotation elements respectively correspond to a fifth sun gear, a fifth planetary carrier, and a fifth ring gear.

13. The planetary gear train of claim 8, wherein the first, second, third, fourth, and fifth planetary gear sets are disposed in order of the fourth, first, second, third, and fifth planetary gear sets from an engine side.

14. The planetary gear train of claim 8, wherein the first, second, third, fourth, and fifth planetary gear sets are disposed in order of the fourth, first, third, fifth, and second planetary gear sets from an engine side.

15. A planetary gear train of an automatic transmission for a vehicle, the planetary gear train comprising:
- an input shaft configured to receive power from an engine;
- an output shaft configured to output power;
- a first planetary gear set having first, second, and third rotation elements;
- a second planetary gear set having fourth, fifth, and sixth rotation elements;
- a third planetary gear set having seventh, eighth, and ninth rotation elements;
- a fourth planetary gear set having tenth, eleventh, and twelfth rotation elements;
- a fifth planetary gear set having thirteenth, fourteenth, and fifteenth rotation elements;
- a first shaft connected with the second rotation element and the input shaft;
- a second shaft connected with the fourteenth rotation element and the output shaft;
- a third shaft connected with the sixth rotation element and the thirteenth rotation element;
- a fourth shaft connected with the seventh rotation element and the fifteenth rotation element;
- a fifth shaft connected with the first rotation element, the fourth rotation element, and the twelfth rotation element;
- a sixth shaft connected with the third rotation element and the eleventh rotation element;
- a seventh shaft connected with the fifth rotation element and the eighth rotation element; and
- eighth and ninth shafts selectively connected with a transmission housing, wherein the eighth and ninth shafts are respectively connected to a corresponding rotation element of the third and fourth planetary gear sets, and the corresponding rotation element is not connected to another rotation element selected from the rotation elements of the five planetary gear sets.

16. The planetary gear train of claim 15, further comprising: clutches configured to selectively connect the second shaft and the fifth shaft, the sixth shaft and the seventh shaft, and the seventh shaft and the eighth shaft through a corresponding clutch,
wherein the eighth shaft is connected with the tenth rotation element, and
the ninth shaft is connected with the ninth rotation element.

17. The planetary gear train of claim 16, wherein the clutches comprises:
- a first clutch disposed between the second shaft and the fifth shaft;
- a second clutch disposed between the sixth shaft and the seventh shaft; and
- a third clutch disposed between the seventh shaft and the eighth shaft,
wherein the planetary gear train further includes:
- a first brake disposed between the fourth shaft and the transmission housing;
- a second brake disposed between the ninth shaft and the transmission housing; and
- a third brake disposed between the eighth shaft and the transmission housing.

18. The planetary gear train of claim 15, wherein the first, second, and third rotation elements are respectively a first sun gear, a first planetary carrier, and a first ring gear,
the fourth, fifth, and sixth rotation elements are respectively a second sun gear, a second planetary carrier, and a second ring gear,
the seventh, eighth, and ninth rotation elements are respectively a third sun gear, a third planetary carrier, and a third ring gear,
the tenth, eleventh, and twelfth rotation elements are respectively a fourth sun gear, a fourth planetary carrier, and a fourth ring gear, and
the thirteenth, fourteenth, and fifteenth rotation elements are respectively a fifth sun gear, a fifth planetary carrier, and a fifth ring gear.

19. The planetary gear train of claim 15, wherein the first, second, third, fourth, and fifth planetary gear sets are disposed in order of the fourth, first, second, third, and fifth planetary gear sets from an engine side.

20. The planetary gear train of claim 15, wherein the first, second, third, fourth, and fifth planetary gear sets are disposed in order of the fourth, first, third, fifth, and second planetary gear sets from an engine side.

* * * * *